United States Patent
Klein et al.

(10) Patent No.: US 12,086,407 B2
(45) Date of Patent: Sep. 10, 2024

(54) INTELLIGENT KEYBOARD ATTACHMENT FOR MIXED REALITY INPUT

(71) Applicant: Microsoft Technology Licensing, LLC, Redmond, WA (US)

(72) Inventors: Andrew Jackson Klein, Vancouver (CA); Hendry Effendy, Kirkland, WA (US); Ethan Harris Arnowitz, Vancouver (CA); Jonathon Burnham Cobb, Vancouver (CA); Melissa Hellmund Vega, Vancouver (CA); Stuart John Mayhew, Seattle, WA (US); Jeremy Bruce Kersey, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/468,682

(22) Filed: Sep. 15, 2023

(65) Prior Publication Data
US 2024/0004545 A1 Jan. 4, 2024

Related U.S. Application Data

(63) Continuation of application No. 17/591,575, filed on Feb. 2, 2022, now Pat. No. 11,797,175.

(60) Provisional application No. 63/275,844, filed on Nov. 4, 2021.

(51) Int. Cl.
*G06F 3/00* (2006.01)
*G06F 3/04886* (2022.01)
*G06T 7/70* (2017.01)
*G06T 19/00* (2011.01)

(52) U.S. Cl.
CPC ............ *G06F 3/04886* (2013.01); *G06T 7/70* (2017.01); *G06T 19/006* (2013.01)

(58) Field of Classification Search
None
See application file for complete search history.

(56) References Cited

U.S. PATENT DOCUMENTS

| 11,402,871 B1* | 8/2022 | Berliner | G06F 3/04886 |
| 2019/0018498 A1* | 1/2019 | West | G06F 3/012 |
| 2021/0011556 A1* | 1/2021 | Atlas | G06F 3/011 |

FOREIGN PATENT DOCUMENTS

| EP | 3599532 A2 * | 1/2020 | G02B 27/017 |

* cited by examiner

*Primary Examiner* — Tapas Mazumder
(74) *Attorney, Agent, or Firm* — Foley IP Law, PLLC

(57) ABSTRACT

Systems and methods for attaching a virtual input device to a virtual object in a mixed reality (MR) environment are provided. The system includes a memory, a processor communicatively coupled to the memory, and a display device. The display device is configured to display a MR environment provided by at least one application implemented by the processor. The mixed reality environment includes a virtual object corresponding to an application, and a virtual input device. The at least one application docks the virtual input device to the virtual object with an offset relative to the virtual object.

20 Claims, 9 Drawing Sheets

INTELLIGENT KEYBOARD ATTACHMENT FOR MIXED REALITY INPUT

CROSS-REFERENCE TO RELATED APPLICATION(S) AND CLAIM OF PRIORITY

This application is a continuation of and claims priority to U.S. Non-Provisional application Ser. No. 17/591,575, entitled "INTELLIGENT KEYBOARD ATTACHMENT FOR MIXED REALITY INPUT" filed on Feb. 2, 20223, which claims priority to U.S. Provisional Patent Application No. 63/275,844 entitled "INTELLIGENT KEYBOARD ATTACHMENT FOR MIXED REALITY INPUT" filed on Nov. 4, 2021. The above-identified provisional patent application is hereby incorporated by reference in its entirety.

BACKGROUND

In an augmented reality (AR) environment, digital objects, such as annotations, control objects, and virtual reality (VR) objects, are overlaid with live real-world (RW) images in a user display, such as goggles or another head mounted device. One function of AR is to provide additional information to a user about an RW object, such as highlighting an RW object and/or providing additional information about that RW object—within the user's view, or to provide a virtual object proximate to and/or in conjunction with a RW object. As used herein, MR is an extension of AR, in which the digital objects displayed to the user (and with which the user may be able to interact) include virtual reality (VR) objects. There is often a need for virtual objects, such as menus, control panels, and display screens, in AR and MR environments, to receive an input. The virtual objects are a subset of the digital objects that are available for display to the user and may correspond to a particular application, which may further have a RW counterpart.

In VR and/or MR systems, users may desire to provide an input to the virtual object, such as a panel. Thus, VR and MR systems can include one or more virtual input devices that correspond to the virtual object and enable the user to provide an input to the virtual object. However, current iterations of virtual input devices are typically provided based on a location of the user or a position of a body of the user. This presents challenges when the user moves and/or when other virtual objects are present in the VR or MR environment, because the virtual input device moves with the user and can intersect with other objects. The intersection or collision of the virtual input device with other objects, whether real or virtual, can frustrate the user and reduce trust in the VR or MR platform.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and computerized method for attaching a virtual input device to a virtual object in a MR environment is provided. The system includes a memory, a processor communicatively coupled to the memory, and a display device. The display device is configured to display a MR environment provided by at least one application implemented by the processor. The mixed reality environment includes a virtual object corresponding to an application, and a virtual input device. The at least one application docks the virtual input device to the virtual object with an offset relative to the virtual object.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
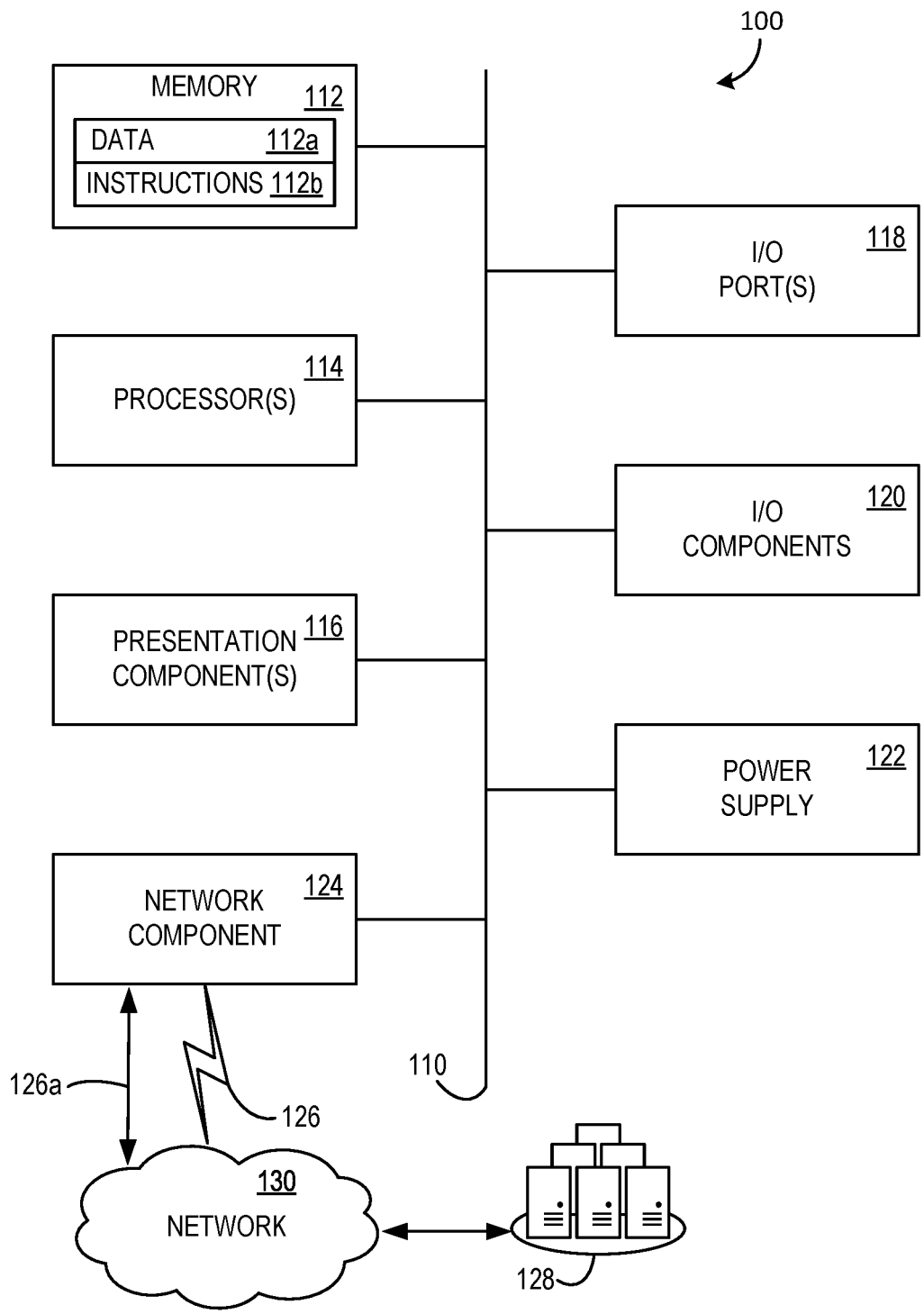
FIG. 1 is a block diagram illustrating an example computing device for implementing various examples of the present disclosure.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Various implementations of the present disclosure provide systems and methods for attaching a virtual input device to an active input source in a VR or MR environment. In some implementations, a system is provided. The system includes a memory storing one or more applications, a processor communicatively coupled to the memory, and a display device configured to display a VR or MR environment provided by at least one application implemented by the processor, wherein the VR or MR environment includes a virtual object corresponding to an application and a virtual input device, wherein the at least one application attaches the virtual input device to the virtual object.

In some implementations, a method for attaching a virtual input device to a virtual panel is provided. The method includes positioning a virtual panel within a VR or MR environment, the virtual panel corresponding to an application and attaching a virtual input device to the virtual panel in the VR or MR environment.

As mentioned above, the intersection or collision of the virtual input device with other objects, whether real or virtual, can frustrate the user and reduce trust in the VR or MR platform. For example, virtual objects are digital objects, as opposed to physical, real-world objects. It should be understood that the concepts presented herein as disclosed may apply to either or both of virtual reality and mixed reality environments, but for the purposes of illustration mixed reality will be discussed throughout the various examples disclosed. Various examples of the present disclosure address these challenges by providing systems and methods for attaching a virtual input device to an active input source in a MR environment. For example, rather than providing a virtual input device proximate to a user, the systems and methods presented herein attach to, or anchor to, magnetize, dock to, insert into, snap onto, link to, or otherwise create a hierarchical positioning transformational relationship with such that the virtual input device inherits a position from, the virtual input device to the particular virtual object, or panel, in which the virtual object used to invoke the virtual input device is used to provide an input. As the virtual object moves, or is moved, about the virtual reality or mixed reality environment, the virtual input device also moves with the virtual object. To the user, this provides a consistent, predictable experience because the virtual input device and the virtual object the virtual input device is attached to appear together in the same window.

As referenced herein, a virtual keyboard is one example of a virtual input device. The terms virtual keyboard and virtual input device can be used interchangeably throughout the illustrative examples presented herein. In some implementations, a virtual keyboard is one example of a virtual input device. However, various implementations are possible and the virtual input device can be any input device used to provide an input to a virtual object. For example, the virtual input device can be a holographic numeric pad for tasks which only require numbers, such as entering a personal identification number (PIN). In yet another example, the virtual input device can be a color palette selector which affects a nearby or distant target.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, VMs, mobile tablets, hand-held devices, consumer electronics, specialty computing devices, head mounted devices (HMDs), etc. The disclosed examples may also be practiced in distributed computing environments when tasks are performed by remote-processing devices that are linked through a communications network. In some implementations, the computing device 100 generates a virtual reality or mixed reality environment in which virtual objects are generated, displayed, and interacted with.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif., ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

In some implementations, the presentation component 116 is a virtual object, also referred to herein as a panel. The virtual object can be an interface for a particular application that is displayed in virtual form in a VR or MR environment. In some implementations, the I/O component 120 is a virtual input device, for example a virtual keyboard, that is utilized to provide an input to the presentation component 116, i.e., the virtual object. As described in greater detail below, the virtual input device is attached, also referred to herein as aligned, anchored, or coupled, to the virtual object in the VR or MR environment.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128, such as one or more of the cloud-computing environments depicted in FIGS. 2-10. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

As noted above, various examples of the present disclosure provide systems and methods for attaching a virtual input device to an active input source in a virtual reality or mixed reality environment. A virtual reality environment is an environment that includes only holographic and/or other virtual images which are generated and displayed to a user. A mixed reality environment includes both i) holographic and/or virtual images which are generated and displayed to a user, and ii) one or more physical objects in the surrounding real-world environment that are viewable by a user.

Figure 2:
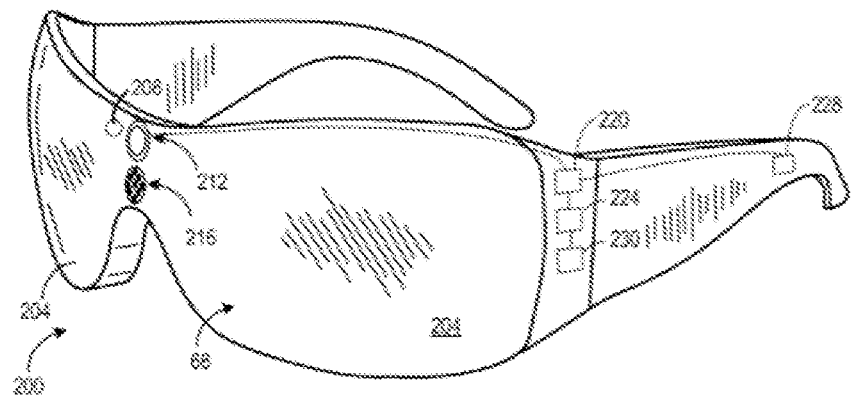
FIG. 2 illustrates a head mounted device (HMD) according to various implementations of the present disclosure.

FIG. 2 illustrates a head mounted device (HMD) according to various implementations of the present disclosure. The HMD 200 is presented for illustration only. Various implementations of the HMD 200 can be provided without departing from the scope of the present disclosure. For example, additional elements can be added to the HMD 200, various elements can be omitted, and so forth.

In some implementations, the HMD 200 is used to provide the VR or MR environment to a user who is wearing the HMD 200. As discussed herein, it should be understood that the concepts presented herein as disclosed may apply to either or both of virtual reality and mixed reality environments, but for the purposes of illustration mixed reality will be discussed throughout the various examples that follow. For example, the HMD 200 can be worn on, above, or around the user's head so that the user can look at or through the HMD 200 and be provided with the virtual reality or mixed reality environment. As illustrated in FIG. 2, the HMD 200 includes one or more lenses 204 through which a user can look with their eyes, a first sensor 208 that faces inward to acquire image data, such as eye-tracking information of a user's eyes or gaze, and a second sensor 212 that captures images of objects within a field of view, such as physical, or real-world, objects in the physical environment and gesture-based inputs or other movements performed by the user. In some implementations, the HMD 200 further includes one or more of a light source 216, a motion sensor 220, a microphone 224, a speaker 228, and/or a processor 230.

Figure 3:
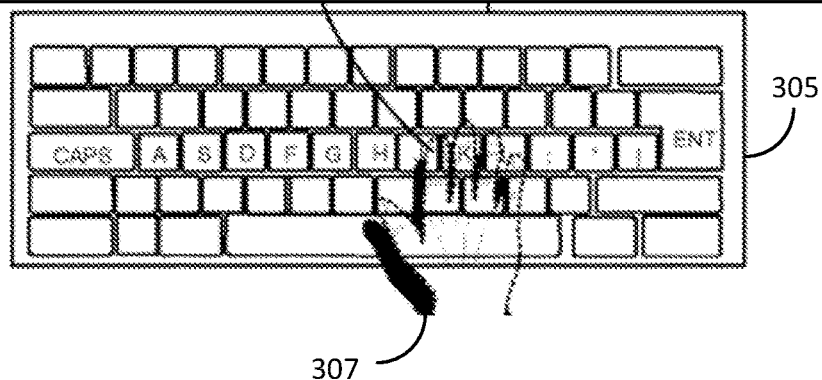
FIG. 3 illustrates a mixed reality (MR) environment including a virtual object and a virtual input device according to various implementations of the present disclosure.

FIG. 3 illustrates a MR environment including a virtual object and a virtual input device according to various implementations of the present disclosure. The environment 301 is presented for illustration only. Various implementations of the environment 301 can be provided without departing from the scope of the present disclosure. For example, additional elements can be added to the environment 301, various elements can be omitted, and so forth.

In some implementations, the environment 301 is the environment presented or provided by the HMD 200. For example, the environment 301 can be provided by the HMD 200, provided by a connected processing system, or provided by a cloud-based system and presented through a cloud-connected HMD 200, or any other suitable scenario. In some implementations, the environment 301 is a three-dimensional mixed-reality (MR) environment. In some implementations, the environment 301 is a virtual desktop.

The environment 301 includes a virtual object 303. The virtual object 303 can be a virtual representation of an interface, such as a user interface. In some implementations, the virtual object 303 is an example of the presentation component 116. In some implementations, the virtual object 303 corresponds to a particular application, such as a virtual representation of an application that can be otherwise accessed or implemented on a physical device. For example, the virtual object 303 can be a virtual version of a contacts application, a gaming application, a web browsing application, a messaging application, a productivity application, and so forth. In some implementations, the virtual object 303 is referred to herein as a panel.

The virtual object 303 is provided at a particular location with a particular orientation within the environment 301 that is established by the HMD 200. For example, the virtual object 303 includes a particular position within the three-dimensional MR environment 301, which is articulated by a particular set of x, y, and z coordinates in the environment 301. In some implementations, the particular location within the environment 301 at which the virtual object 303 is placed is relative to a height of the user of the HMD 200 and a direction in which the user is looking through the HMD 200. For example, a position, including a height and direction, of the HMD 200 is determined and the virtual object 303 is placed at a corresponding location within the environment. In some implementations, the corresponding location is determined to be within a particular distance of the HMD 200, such as within a standard arm's reach, and at a height that is neither too high nor too low to be reasonably viewed and interacted with. For example, the height can be between 12 inches and 24 inches below the HMD 200 and the distance can be between two and four feet from the HMD 200. Accordingly, the virtual object 303 may be provided higher for a taller user than a shorter user, or lower for a user that is sitting or crouching than a user who is standing.

In some implementations, the placement of the virtual object 303 within the environment 301 is based upon whether the virtual object 303 is activated with a right hand of the user or a left hand of the user. In other words, the virtual object 303 is slightly offset to provide an ergonomic placement, such that the virtual object 303 is ready for and optimized toward a next interaction following one hand or another.

The virtual object 303 further includes the orientation at the particular position. For example, the orientation can be expressed as an angle of rotation around each of the three axes, or as a mathematical equivalent such as a basis matrix or a quaternion.

In some implementations, the location and orientation of the virtual object 303 within the environment 301 is placed in proximity to another virtual object, such as the virtual object 403 or 503, which are described in greater detail below. In some implementations, particularly such as when the environment 301 is a MR environment, the virtual object 303 is placed in proximity to a real object or marker that is detected in the physical environment.

In some implementations, the particular location and orientation of the virtual object 303 is based at least in part on the application the virtual object 303 corresponds to. In some implementations, the particular location and orientation of the virtual object 303 is based at least in part on the type of input the virtual object 303 is most likely to receive. For example, a virtual object 303 that receives a touch input is placed at a location and orientation conducive to the user comfortably providing a touch input, such as around waist height of the user between one and three feet away from the user. In contrast, a virtual object 303 that receives a gaze input is placed at a location and orientation conducive to the user comfortably providing the gaze input, such as approximately the same height as the eyes of the user and further away from the user, such as at least two meters from the user. In some implementations, particular locations such as a distance from the user, a height relative to the user, and so forth are determined based on the known location and orientation of the HMD 200. For example, the eyes of the user for a gaze input are approximately the height of the HMD 200 and the waist of the user are approximately half the distance of the HMD 200 from the ground.

In some implementations, the virtual object 303 is initially placed within the environment 301 based on a height of the user wearing the HMD 200. The processor 114 determines a height of the user wearing the HMD 200 and places the virtual object 303 accordingly. For example, the processor 114 determines a distance from the HMD 200 from the ground of the environment 301 to determine a height of the user and, therefore, a height for the virtual object 303 to be placed above the ground.

In some implementations, the virtual object 303 is placed a set distance in front of the HMD 200 in order to optimize the ergonomic usability of the virtual object 303. For example, the HMD 200 can be placed thirty centimeters, forty centimeters, or fifty centimeters away from one or more lenses 204 of the HMD 200 such that the lenses 204 are between the user and the virtual object 303. In another implementation, the virtual object 303 is placed a distance away from the HMD 200 based on an analysis of the body of the user of the HMD 200. For example, hand motions of the user can be tracked, and an average of the hand motions can be summed to identify a length of the user's arms. In this manner, the virtual object 303 can be placed or moved to a precise distance based on the particular of the HMD 200.

The virtual object 303 is movable within the environment 301. For example, the virtual object 303 can be moved to a different set of x, y, and z coordinates in the environment 301. The virtual object 303 can be moved within the environment 301 by various methods. In some implementations, the virtual object 303 can be moved to a different set of x, y, and z coordinates in response to an input or a gesture performed by the user, such as by the user grabbing an edge of the virtual panel in the MR space and dragging or otherwise moving and placing the virtual object 303 in a different location within the MR space. In some implementations, the virtual object 303 can be moved to a different set of x, y, and z coordinates automatically in response to an event in the environment 301, such as another application being opened, closed, or moved. In some implementations, the virtual object 303 is moved to a different set of x, y, and z coordinates in response to a change within the environment 301, such as the user moving out of reach or summoning the virtual object 303 with a command or gesture as described herein.

In some implementations, the virtual object 303 moves within the environment 301 with the movement of the user's head, identified by movement of the HMD 200. In other implementations, a field of view is generated for the user of the HMD 200 and the virtual object 303 moves when the movement of the HMD 200 causes the virtual object 303 to no longer be included in the field of view. The field of view that includes all virtual objects 303 and real objects in the environment 301. When the field of view has changed and the virtual object 303 no longer is included in the field of view, the virtual object 303 is returned to the field of view. For example, the position of the HMD 200 is representative of the head position of the user and includes one or more data vectors representing the look direction of the user. This data vector can be used to check for an intersection with a radius of a target object, such as the virtual object 303. In examples where an intersection is not identified, the virtual object 303 is determined to not be within the field of view and moved back into the field of view where the intersection is identified.

In some implementations, the virtual object 303 is returned to the field of view by being gradually reintroduced to the field of view. For example, the virtual object 303 can ease in or ease out of the field of view by gently moving to catch up to the field of view, rather than adjusting with each small movement of the field of view. In this way, the automatic following of the virtual object 303 to the field of view provides a comfortable viewing experience for the user of the HMD 200 that is more alive and organic than automatically following each small movement of the head of the user of the HMD 200.

The environment 301 further includes a virtual input device 305. In some implementations, the virtual input device 305 is a virtual keyboard. However, although a virtual keyboard is illustrated, this illustration should not be construed as limiting and other implementations are possible. In some implementations, the virtual input device 305 is a virtual reality or augmented reality input device. In some implementations, the virtual input device 305 is provided corresponding to the particular application presented on the virtual object 303.

The virtual input device 305 is configured to enable an input to the application corresponding to the virtual object 303. In some implementations, as illustrated in FIG. 3, a user input is provided via a hand 307 of a user interacting with the virtual input device 305. In some implementations, the virtual input device 305 includes a button to trigger capture of a voice input. In these implementations, the hand 307 of the user presses the voice input button on the virtual input device 305 and then uses their voice to provide the input to the virtual object 303. For example, the hand, or hands, 307 of the user can be occupied, such as working with tools or other devices, which makes providing touch inputs challenging. In these implementations, pressing the voice input button minimizes the required button presses. Using voice to provide the input to the virtual object 303 expedites the use of the virtual input device 305 and enables the user to use their hand or hands 307 to do other tasks. In other implementations, the voice function on the virtual input device 305 is activated by voice, for example by the user verbally saying a start command. In these implementations, the voice function can be deactivated by the user saying a stop command, as the virtual input device 305 understands the particular input of the stop command is a command rather than words meant to be entered as an input. In other words, this implementation enables the virtual input device 305 to be utilized via voice without pressing a virtual button on the virtual input device 305.

In some implementations, interactions on the virtual object 303 are used to control the virtual input device 305. For example, an interaction received on the virtual object 303 can clear or close the virtual input device 305. For example, when a user switches activities, i.e., switches to a different virtual object 303, the virtual input device 305 may become detached and/or removed from the virtual object 303 as described herein. The virtual input device 305 returns and reattaches to the virtual object 303 when the user returns to the virtual object 303.

In some implementations, the virtual input device 305 utilizes different gesture and pointer tracking than other applications in the environment 301. Accordingly, the application corresponding to the virtual object 303 is able to receive inputs which the virtual input device 305 has already, or previously processed. For example, when the user moves from a list of contacts to a list of guides on the virtual object 303, the virtual input device 305 remains in the same position, but the entered text can change. For example, if the user typed "Betsy" while the virtual object 303 displayed the contacts page, then moves to the list of work on the virtual object 303 and types "Oil change", the virtual input device 305 will remember the previous search of "Betsy", and keep the association on the various views, saving the user from having to re-type those searches. In some examples, the search results input on the virtual input device 305 affect and sort the content displayed on the virtual object 303. For example, folder sorting and/or file sorting can occur on the virtual object 303 based on the search input received via the virtual input device 305. However, it should be understood that these implementations are provided for illustration only and various implementations are possible. Various implementations do not save a previously entered search query to be processed later.

In some implementations, the virtual object 303 disables other mechanisms to receive an input while the virtual input device 305 is attached to the virtual object 303. For example, a user interface in a VR or MR environment traditionally enables gesture interactions such as gaze interactions and/or hand-ray interactions. To prevent these interactions from being inadvertently triggered, the virtual object 303 can disable these gesture input mechanisms while the virtual input device 305 is open and attached to the virtual object 303.

In some implementations, the virtual input device 305 and/or the virtual object 303 includes specific virtual buttons that, when used to provide an input, perform specific operations on the virtual object 303. For example, one or both of the virtual input device 305 and/or the virtual object 303 includes a pressable button containing an icon that opens a text field, a pressable area containing the text that the user has entered in the text field, a pressable clearing button that resets the control, a scrolling, clipped region that contains the text and handles overflow, a viewing window that provides live updates as text is edited, and a blinking insertion caret that can be moved about the environment 301 via cursor keys on the virtual input device 305.

In some implementations, the virtual input device 305 is provided proximate to the particular virtual object 303 that most recently invoked the virtual input device 305. For example, the virtual input device 305 is attached to, or aligned with, anchored to, connected to, etc., the particular virtual object 303 for which the virtual input device 305 is intended to be used to provide an input. A determination of which virtual object 303 the virtual input device 305 is intended to provide the input for is made in various ways in which the user intentionally interacts with a given window. In some implementations, the intent can be determined via gaze through the HMD 200 and the user can select the virtual object 303 using the gaze. In some implementations, the intent is determined based on the user interacting with the virtual object 303, such as by moving toward and touching the virtual object 303. In some implementations, the intent is determined based on the user utilizing a laser, either physical or virtual, to identify the virtual object 303. In some implementations, the intent is based on the last virtual object 303 which the user interacted with and/or used to invoke the virtual input device 305. In other words, the particular location and orientation of the virtual input device 305 is dependent upon the position of the virtual object 303. The x, y, and z coordinates and orientation of the virtual object 303 are used to generate the corresponding x, y, and z coordinates and orientation of the virtual input device 305. In the environment 301, as illustrated in FIG. 3, the virtual input device 305 is provided directly below the virtual object 303 to enable the user to provide the input to the virtual object 303 via the virtual input device 305 without obstructing the view of the virtual object 303. However, this illustration should not be construed as limiting. Various implementations are possible. In some examples, the virtual input device 305 can be provided above or to either side of the virtual object 303.

In some implementations, the virtual input device 305 moves within the environment 301 with the movement of the user's head, identified by movement of the HMD 200, and/or movement of the virtual object 303. In other implementations, the virtual input device 305 moves as the movement of the HMD 200 causes the virtual input device 305 to no longer be included in the field of view. When the field of view has changed and the virtual input device 305 no longer is included in the field of view, the virtual input device 305 is gradually reintroduced to the field of view. In other words, the virtual input device 305 can ease in or ease out of the field of view so the virtual input device 305 gently moves to catch up to the field of view. In this way, the automatic following of the virtual input device 305 to the field of view provides a comfortable viewing experience for the user of the HMD 200 that is more alive and organic than automatically following each small movement of the head of the user of the HMD 200.

In some implementations, the virtual object 303 is referred to as a parent and the virtual input device 305 is referred to as a child of the virtual object 303. For example, the virtual input device 305 can be invoked and call to an application programming interface (API) of the application the virtual object 303 to identify a position. The application of the virtual object 303 provides a state of the virtual object 303, which includes the three-dimensional position and orientation of the virtual object 303 in the MR space, i.e., the x, y, and z coordinates, to the virtual input device 305 and positions and orients the virtual input device 305 accordingly with x, y, and z coordinates that are slightly offset from the x, y, and z coordinates of the virtual object 303.

As referenced herein, the offset refers to the angle at which the virtual input device 305 is provided relative to the virtual object 303. In other words, the virtual input device 305 is docked, attached, etc. at an offset angle, e.g., greater than zero degrees, to the virtual object 303. In some implementations, the offset is both a transformation, having a distance referenced in terms of the x, y, z-axis, and a rotation, having an angle referenced in terms of the x, y, z-axis. Accordingly, the virtual input device 305 can be offset with both a distance from the user of the HMD 200 and an angle relative to the user of HMD 200, i.e., tilted toward, away from, or to the side of the user of the HMD 200.

As referenced herein, docking the virtual input device 305 to the virtual object 303 refers to creating a hierarchical positioning transformational relationship between the virtual object 303 and the virtual input device 305 such that the virtual input device 305 inherits a position from the virtual object 303. In some implementations, the hierarchical positioning relationship includes one or more of a distance, an orientation, and an angle between the virtual object 303 and the virtual input device 305. In some implementations, the hierarchical positioning relationship is maintained throughout movement of one or more of the virtual object 303, the virtual input device 305, or a field of view that includes the virtual object 303 and the virtual input device 305.

In some implementations, the offset of the virtual input device 305 from the virtual object 303 is such that the virtual input device 305 is provided at the optimal ergonomic angle to provide an input to the virtual object 303. In one implementation, the virtual object 303 can be rotated and maintain the offset with the virtual input device 305 but tilting the virtual object 303 changes the offset. In other words, the offset between the virtual object 303 and the virtual input device 305 is fixed. In another implementation, the offset between the virtual object 303 and the virtual input device 305 is dynamic. For example, the virtual object 303 can be tilted, i.e., lean or recline, while maintaining the position of the virtual input device 305 in order to maintain the usable, ergonomic angle of the virtual input device 305. Accordingly, the distance offset between the virtual object 303 and the virtual input device 305 is maintained, but the angle offset can change depending on the tilt of the virtual object 303.

In some implementations, the distance and angle offset between the virtual object 303 and the virtual input device 305 is set automatically. In other implementations, the distance and angle offset between the virtual object 303 and the virtual input device 305 is determined by a user, such as the user of the HMD 200. For example, the user of the HMD 200 can identify a particular location for the virtual object 303 relative to the HMD 200 while maintaining the default location of the virtual input device 305. As an example, the user of the HMD 200 can identify a particular location for the virtual object 303 to be presented, such as the same height off the ground as the HMD 200 with an offset of six inches to the left, as the HMD 200 moves about the environment 301. As another example, the user of the HMD 200 can identify a particular location for the virtual input device 305 to be presented as the HMD 200 moves about the environment 301.

It should be understood that operating in a MR environment, such as the environment 301, is a dynamic endeavor. In other words, as the user moves about the environment 301 to accomplish various goals and tasks, the user regularly manually moves virtual objects 303 or the virtual objects 303 automatically move to the follow the user. Aspects of the present disclosure recognize and take into account that the virtual input device 305 should move with the parent virtual object 303 to accommodate the flow of physical work. In implementations where the parent, i.e., the virtual object 303, moves and is oriented within the environment 301, the child, i.e., the virtual input device 305, also moves and is oriented in a corresponding manner to maintain its position relative to the virtual object 303. For example, where the virtual object 303 moves five units in the x direction, the virtual input device 305 also moves five units in the x direction. Accordingly, the virtual object 303 x, y, z movement values are propagated to the virtual input device 305 x, y, z values while maintaining the intentional offset of the virtual input device 305 to the virtual object 303.

In some implementations, the virtual object 303 and the virtual input device 305 are moved and/or rotated together as a singular element. For example, the user can move the virtual input device 305 to reposition for more ergonomic typing and the virtual object 303 repositions by inheriting the new position of the virtual input device 305. In other words, in some implementations the virtual input device 305 acts as the parent device and the virtual object 303 acts as the child device. In these implementations, the HMD 200 can generate a colliding box around the virtual input device 305 that can be grabbed the user to move and/or rotate the virtual input device 305 and the virtual object 303 as one. The colliding box may or may not also include the virtual object. The colliding box may or may not be visible to the user within the environment 301.

In some implementations, the location of the virtual object 303 and the virtual input device 305 within the environment 301 is independent of a location of the user within the environment 301. For example, an original position of the virtual object 303 and the virtual input device 305 within the environment 301 can be provided proximate to an original position of the user at the time the virtual object 303 and the virtual input device 305 are originally called. Although the user may move to a second position, different than the original position, the virtual input device 305 maintains its position relative to the virtual object 303 rather than moving with the user to a second position.

In some implementations, the virtual object 303 is moved within the environment 301 based on particular gesture inputs being received at the virtual object 303. For example, the user can 'grab' and move the virtual object 303, which is identified using one or more of hand proximity feedback, visual grab state feedback, and release state feedback. The virtual object 303 can include a top grab bar to enable the virtual object 303 to be grabbed and moved. In some implementations, the top grab bar also includes an additional minimize window button.

Figure 4:
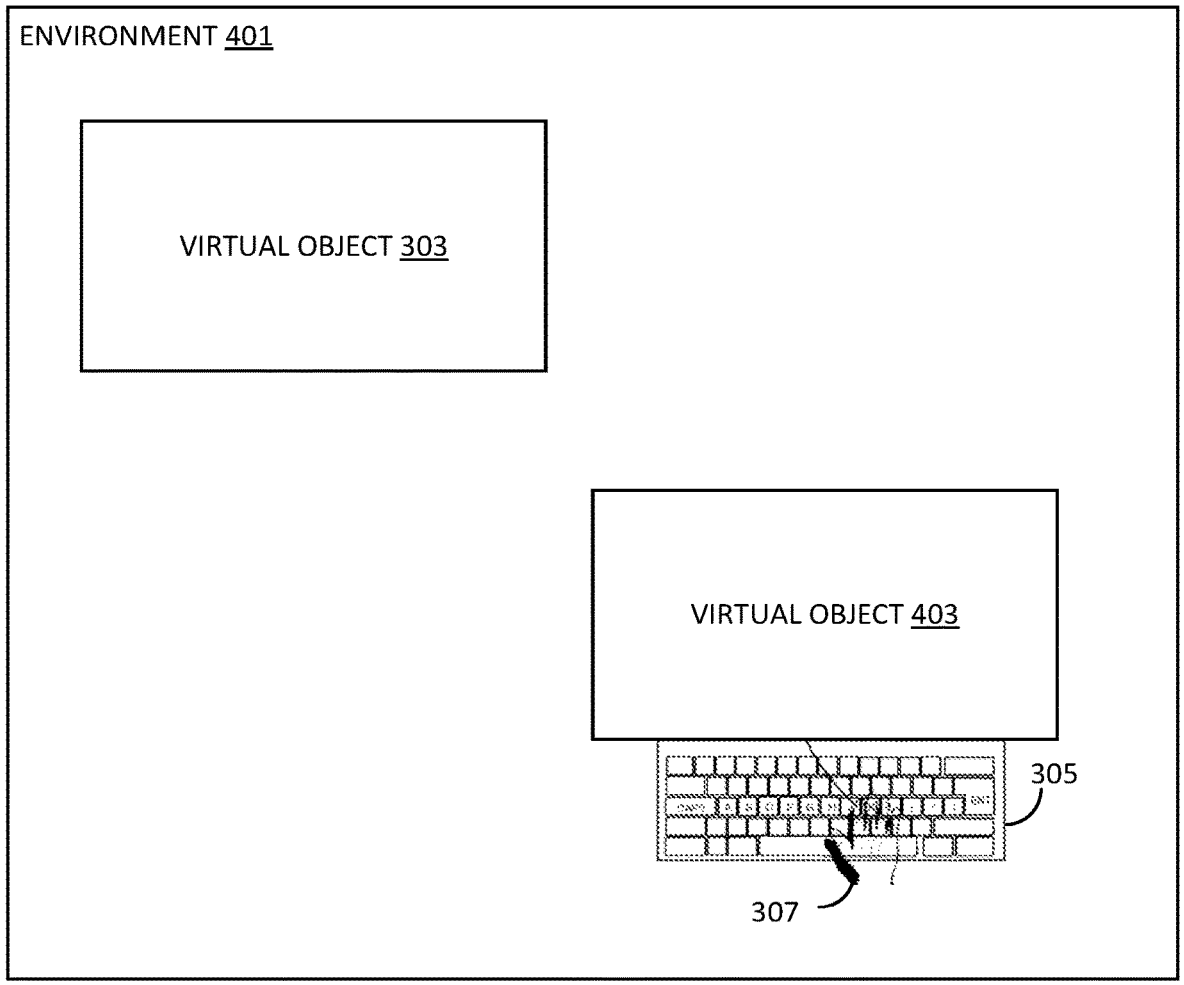
FIG. 4 illustrates a MR environment including two virtual objects and a virtual input device according to various implementations of the present disclosure.

FIG. 4 illustrates a MR environment including two virtual objects and a virtual input device according to various implementations of the present disclosure. The environment 401 is presented for illustration only. Various implementations of the environment 401 can be provided without departing from the scope of the present disclosure. For example, additional elements can be added to the environment 401, various elements can be omitted, and so forth.

The environment 401 may be an illustrative example of another instance of the environment 301. As shown in FIG. 4, the environment 401 includes the virtual object 303 corresponding to a first application. In some implementations, the user utilizing the HMD 200 opens a second application in addition to the first application. A second virtual object 403 is generated corresponding to the second application. Like the virtual object 303, the second virtual object 403 is provided at a particular position within the three-dimensional environment 401, which is articulated by a particular set of x, y, and z coordinates in the environment 401. In response to the determination of an intent for the user to utilize the virtual input device 305 with the second virtual object 403, the second virtual object 403 repositions the virtual input device 305 to a location proximate to the second virtual object 403. For example, the determination of the intent can be based on the user selecting a button, such as a query button, on the virtual input device 305 to indicate that user input relative to the virtual object 403 is intended or desired. In response to the determination, the virtual input device 305 is detached from the original position proximate to the virtual object 303 and re-attached to the second virtual object 403 at a new location proximate to the second virtual object 403. In implementations where the user transitions back to the first application corresponding to the virtual object 303, the virtual input device 305 is re-positioned to the original location proximate to the virtual object 303.

In other words, the virtual input device 305 is provided at the virtual object corresponding to the application the user, at the particular point in time, intends to interact with. This configuration provides a consistent, predictable experience for the user and is dependent on the particular application being used, rather than the location of the user in the three-dimensional environment 301, 401. The particular application the user intends to interact with is identified by various mechanisms. In some implementations, the particular application the user intends to interact with is based on the current virtual object or panel the user is interacting with. In some implementations, the particular type of input received at the virtual input device 305 depends on the type of application corresponding to the virtual object 303, 403 the virtual input device 305 is attached to at the time. For example, where the virtual object 303 is a contacts list, the input can search for a contact in the contacts list. Where the virtual object 303 is a work application, the input can search for a keyword or a document in the work application. Where the virtual object 303 is an incident report application, the input can be an explanation to fill out the incident report. Where the virtual object 303 is a virtual data pad, the input can enter a numeric value, such as the daily total for a specific process. In various other implementations, the input can scroll or look through a gallery of three-dimensional (3D) content, place content in the environment 301, name an object or content in the environment 301, name a guide or document presented on the virtual object 303, and so forth. It should be understood these examples are for illustration only and should not be construed as limiting. Any type of application can be presented via the virtual objects 303, 403 and receive an input via the virtual input device 305.

The virtual input device 305 is an intelligent input device that can, in some examples, be detached from the particular virtual object based on the intention of the user. In some implementations, a particular input from the user can be received that signals an intent to detach the virtual input device 305 from the virtual object 303. The input can be an input received via the virtual input device 305, a gaze pattern determined by the HMD 200, the selection of an UNDOCK icon on the virtual object 303, 403, an input of a particular button on the virtual input device 305, and so forth. The detachment, i.e., undocking, of the virtual input device 305 from the virtual object 303 enables the virtual input device 305 to switch between different virtual objects in the environment 301, 401 while the user remains stationary. In some implementations, a visual cue or visual aid is provided, once the virtual input device 305 is attached, or docked, indicating the virtual object 303, 403 to which the virtual input device 305 is connected.

In some implementations, the virtual input device 305 is detached, or undocked, from the virtual object 303 and removed from the environment 401. Upon the next invocation, the virtual input device 305 is re-instantiated in the environment 401 as attached, or docked, to the virtual object 303. In other implementations, the virtual input device 305 is detached from the virtual object 303 but remains in the environment 401 and is attached to a new and/or next virtual object 403. In yet other implementations, the virtual input device 305 is detached from the virtual object 303 but remains in the environment 401 and remains in a particular location within the environment 401. In yet other implementations, the virtual input device 305 is detached from the virtual object 303 but remains in the environment 401 with an offset proximate to the user. For example, the virtual input device 305 can be maintained slightly in front of and to the left or right of where the user is determined to be based on the location and orientation of the HMD 200. In some implementations, the detached virtual input device 305 can be summoned to the user or to a particular virtual object 303, 403, such as via a voice command or other mechanism. In this implementation, the virtual input device 305 is located away from the user and enables the user to bring the virtual input device 305 to them quickly, without having to move to retrieve the virtual input device 305, and the virtual input device 305 is moved to a convenient, ready-to-use ergonomic position proximate to the user.

Figure 5:
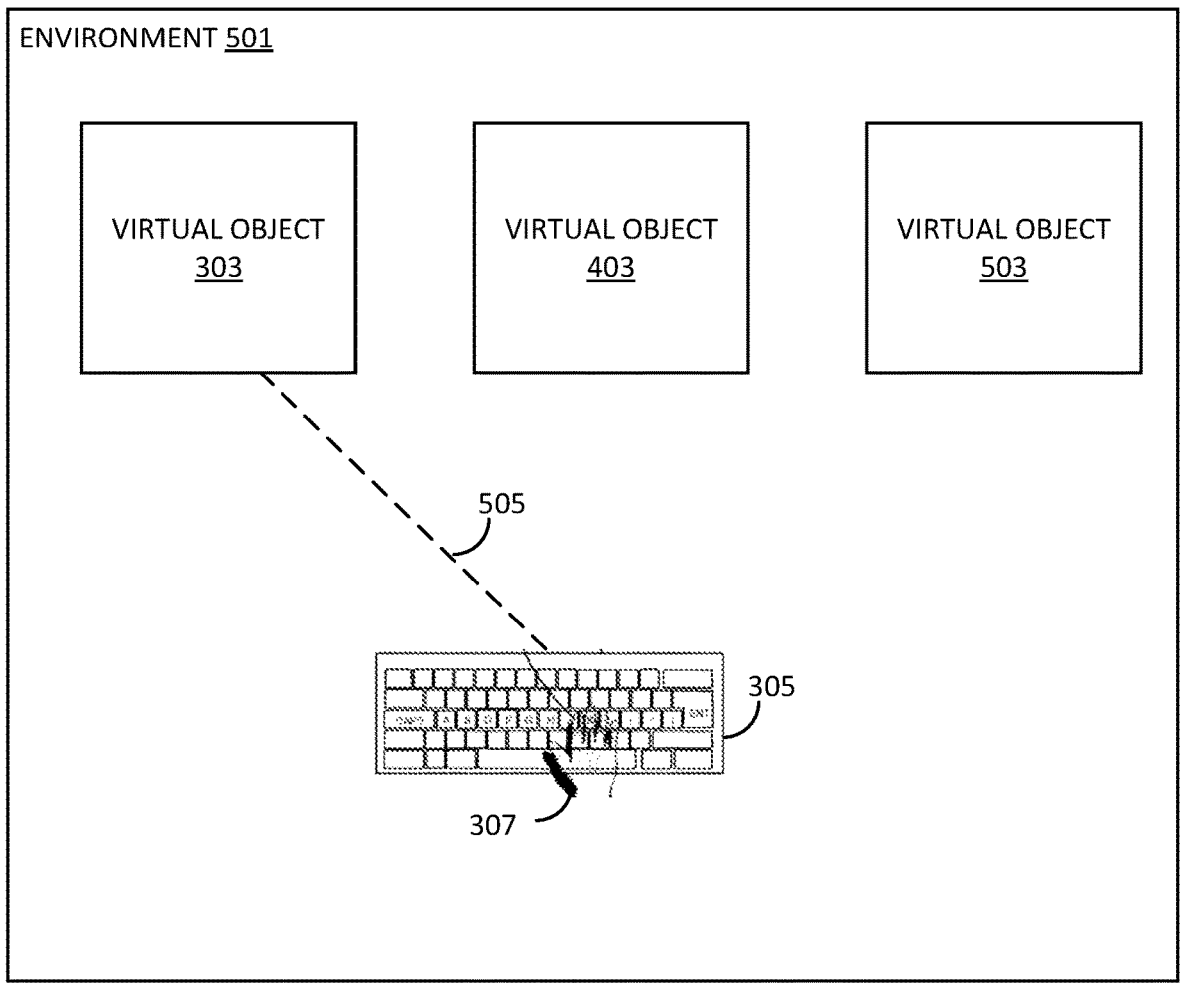
FIG. 5 illustrates a multi-target environment according to various implementations of the present disclosure.

For example, FIG. 5 illustrates a multi-target environment according to various implementations of the present disclosure. The environment 501 may be an illustrative example of another instance of the environment 301 or the environment 401. The environment 501 includes a plurality of virtual objects, such as the virtual object 303, 403, 503. For example, the environment 501 can be a virtual desktop environment and include different virtual objects 303, 403, 503 each corresponding to a different application within the virtual desktop. For example, the virtual object 303 can be a messaging application, the virtual object 403 can be an internet browser application, and the virtual object 503 can be a contacts application. It should be understood that these examples are provided for illustration only and should not be construed as limiting. Each of the virtual objects 303, 403, 503 can correspond to an infinite number of applications in a virtual desktop without departing from the scope of the present disclosure, such as a contacts application, a gaming application, a web browsing application, a messaging application, a productivity application, and so forth.

In some implementations, each virtual object 303, 403, 503 is a separate target for the virtual input device 305. In these implementations, it may be desirable for the virtual input device 305 to be attached to a particular position, for example proximate to the user, as a nearfield floating input device in situations such as where the user is likely to regularly switch between providing inputs to the virtual objects 303, 403, 503. Accordingly, implementations of the present disclosure provide a visual link 505 between the virtual input device 305 and the target virtual object. For example, FIG. 5 illustrates a visual link 505 between the virtual input device 305 and the virtual object 303, indicating that at a particular time, an input received on the virtual input device 305 will generate an input to the virtual object 303. In some implementations, the visual link 505 is a virtual object, such as a line, connecting the virtual input device 305 to the target virtual object and improving user input coherence understanding. In other implementations, the visual link is a visual marker on the target virtual object, such as a sticker, a star, a dot, and so forth, that indicates the particular virtual object as the target virtual object for the virtual input device 305 at a particular point in time.

Figure 6:
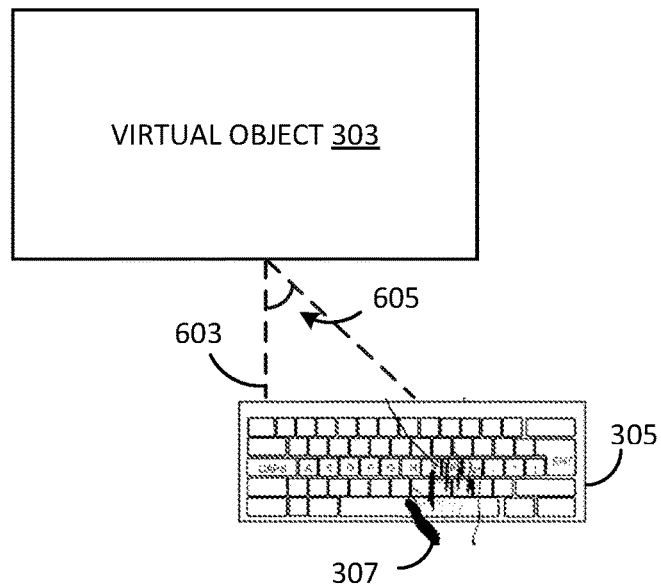
FIG. 6 illustrates offset between a virtual object and a virtual input device according to various implementations of the present disclosure.

FIG. 6 illustrates offset between a virtual object and a virtual input device according to various implementations of the present disclosure. The example illustrated in FIG. 6 is presented for illustration only. Various implementations can be provided without departing from the scope of the present disclosure. For example, additional elements can be added, various elements can be omitted, and so forth.

FIG. 6 illustrates an environment 601. The environment 601 can be any of the environment 301, 401, 501 described herein. The environment 601 includes the virtual object 303 and the virtual input device 305. In some implementations, the environment 601 further includes the hand 307 of the user interacting with the virtual input device 305.

As illustrated in FIG. 6, the virtual input device 305 is provided a distance 603 away from the virtual object 303. In some implementations, the distance 603 is referred to as a docking distance. The distance 603 is maintained between the virtual object 303 and the virtual input device 305 as either of the virtual object 303 and the virtual input device 305 is moved, such as by the hand 307 or through other means. In other words, if the virtual object 303 is moved a particular distance from its original location, the virtual input device 305 is also moved the particular distance from its original location in order to maintain the distance 603 between the virtual object 303 and the virtual input device 305. Likewise, if the virtual input device 305 is moved a particular distance from its original location, the virtual object 303 is also moved the particular distance from its original location in order to maintain the distance 603 between the virtual object 303 and the virtual input device 305.

In some implementations, the distance 603 is based at least in part on the particular type of input device the virtual input device 305 represents. For example, a virtual keyboard resembles a physical keyboard and has a similar size and shape, such as a longer, narrower rectangular shape. In contrast, a color palette selector can be provided as a larger square to accommodate a greater number of color swatches than the virtual keyboard has keys, and therefore is larger than the virtual keyboard. Accordingly, the optimal ergonomic position for a virtual keyboard is different than the optimal ergonomic position for a color palette selector and has a different offset distance and angle.

In some implementations, the distance 603 is predetermined. For example, the distance 603 can be predetermined based on a height of the user of the HMD 200, an arm length of the user of the HMD 200, or a default distance for the particular application. In some implementations, the distance 603 is determined by a user, such as the user of the HMD 200, via an input received on the virtual input device 305 or the HMD 200.

The virtual input device 305 is also provided an angle 605. In some implementations, the angle 605 is referred to as a docking angle. The angle 605 is maintained between the virtual object 303 and the virtual input device 305 as either of the virtual object 303 and the virtual input device 305 is moved, such as by the hand 307 or through other means. In other words, if the virtual object 303 is moved from its original location, the virtual input device 305 is also moved in order to maintain the angle 605 between the virtual object 303 and the virtual input device 305. Likewise, if the virtual input device 305 is moved from its original location, the virtual object 303 is also moved from its original location in order to maintain the angle 605 between the virtual object 303 and the virtual input device 305.

In some implementations, the angle 605 is predetermined. For example, the angle 605 can be predetermined based on a height of the user of the HMD 200, an arm length of the user of the HMD 200, or a default distance for the particular application. In some implementations, the angle 605 is determined by a user, such as the user of the HMD 200, via an input received on the virtual input device 305 or the HMD 200. In some implementations, the angle 605 is dynamic. For example, the angle 605 can be changed via an input received from a user of the HMD 200 to move the virtual input device 305 toward or away from the virtual object 303 depending on the needs of the user at a particular time.

In some implementations, the virtual input device 305 can move with, or follow, the virtual object 303 when the virtual object 303 is moved in order to maintain the distance 603 and the angle 605 between the virtual object 303 and the virtual input device 305, and the virtual object 303 can move with, or follow, the virtual input device 305 when the virtual input device 305 is moved in order to maintain the distance 603 and the angle 605 between the virtual object 303 and the virtual input device 305. In some implementations, the movements of the virtual object 303 and/or the virtual input device 305 can include lateral movement along one or more of the x, y, and z-axis, rotation, tilting, or any other suitable movement. In other implementations, only some of the movements of the virtual object 303 cause a corresponding movement by the virtual input device 305, or vice versa. For example, a lateral movement or rotation by the virtual object 303 can cause a corresponding movement by the virtual input device 305, but a tilting movement by the virtual object 303 may not cause a tilting movement by the virtual input device 305 because such a tilting movement could restrict the usefulness of the user to access the virtual input device 305.

Accordingly, the offset between the virtual object 303 and the virtual input device 305 can be provided in various implementations. In some implementations, the offset of the virtual input device 305 to the virtual object 303 includes a predetermined distance between the virtual input device 305 and the virtual object 303 and a predetermined angle between the virtual input device 305 and the virtual object 303. In some implementations, the offset of the virtual input device 305 to the virtual object 303 includes a predetermined distance between the virtual input device 305 and the virtual object 303 and a dynamic angle between the virtual input device 305 and the virtual object 303. For example, the angle between the virtual object 303 and the virtual input device 305 can change based on a rotation of the virtual object 303 in a particular implementation where the orientation of the virtual input device 305 is fixed so as to not rotate with the virtual object 303. In some implementations, the user provides an input that determines the offset of the virtual input device 305 to the virtual object 303.

FIGS. 7A-7D illustrate a changing field of view including a virtual object and a virtual input device according to various implementations of the present disclosure. The example illustrated in FIGS. 7A-7D are presented for illustration only. Various implementations can be provided without departing from the scope of the present disclosure. For example, additional elements can be added, various elements can be omitted, and so forth.

Figure 7A:
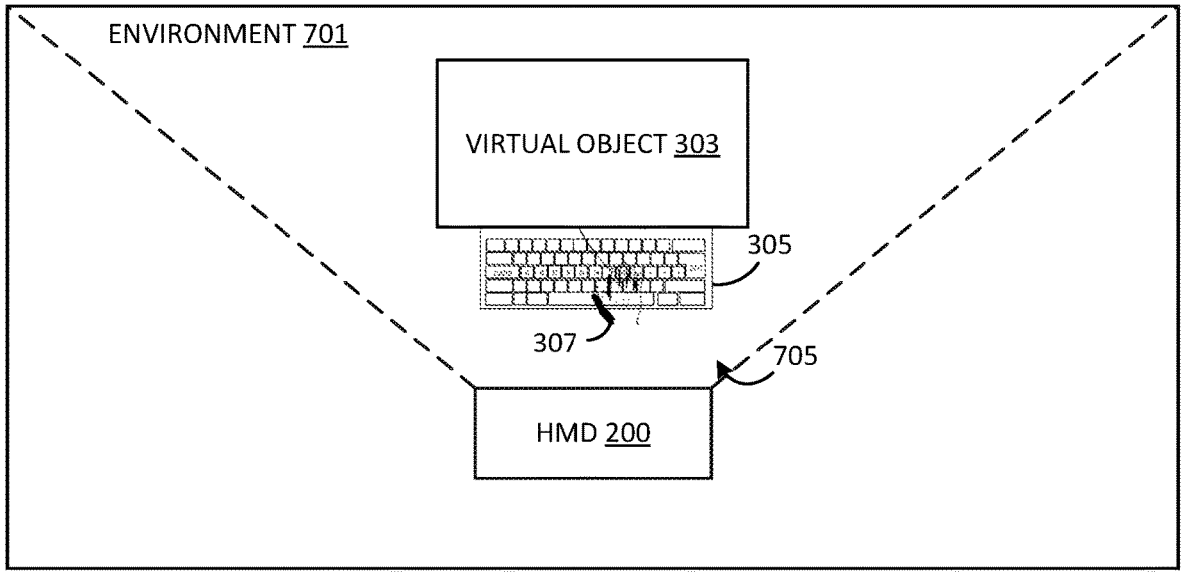
FIGS. 7A-7D illustrate a changing field of view including a virtual object and a virtual input device according to various implementations of the present disclosure.
Figure 7B:
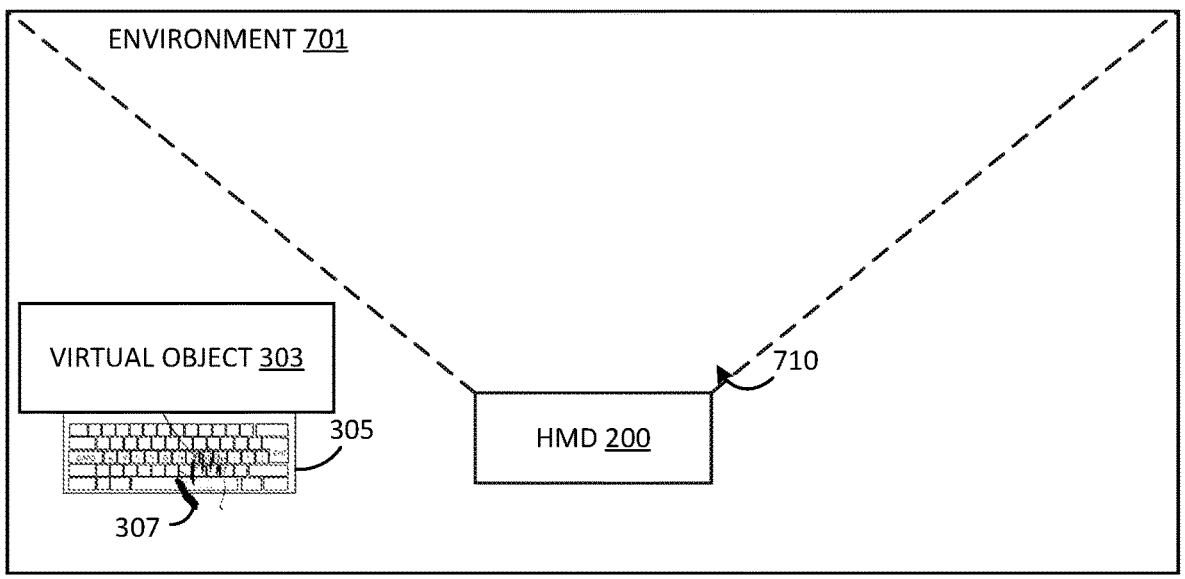
Figure 7C:
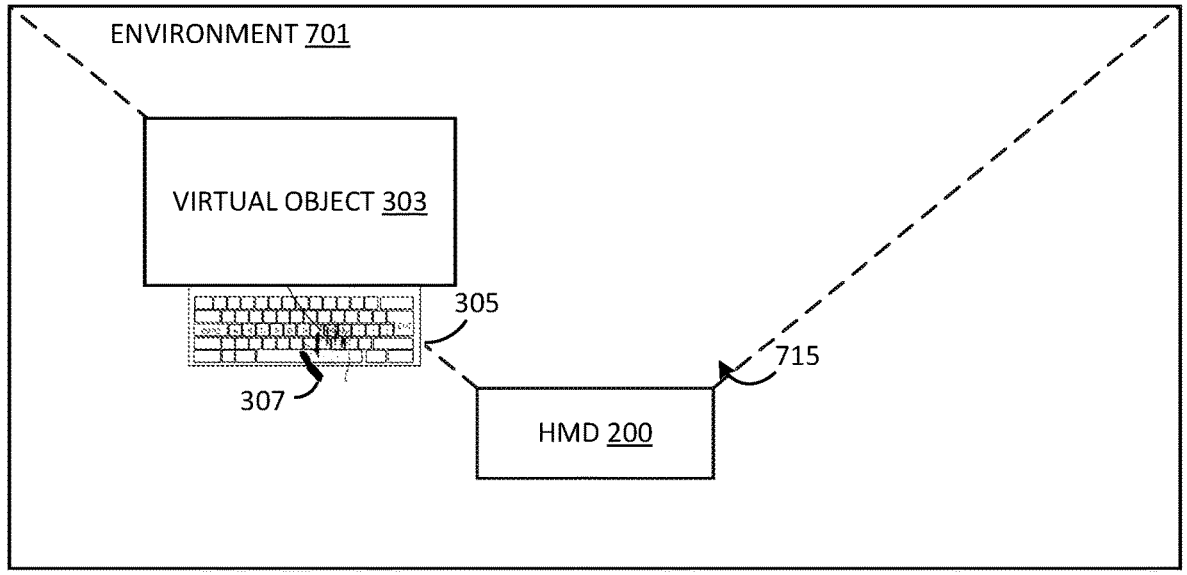
Figure 7D:
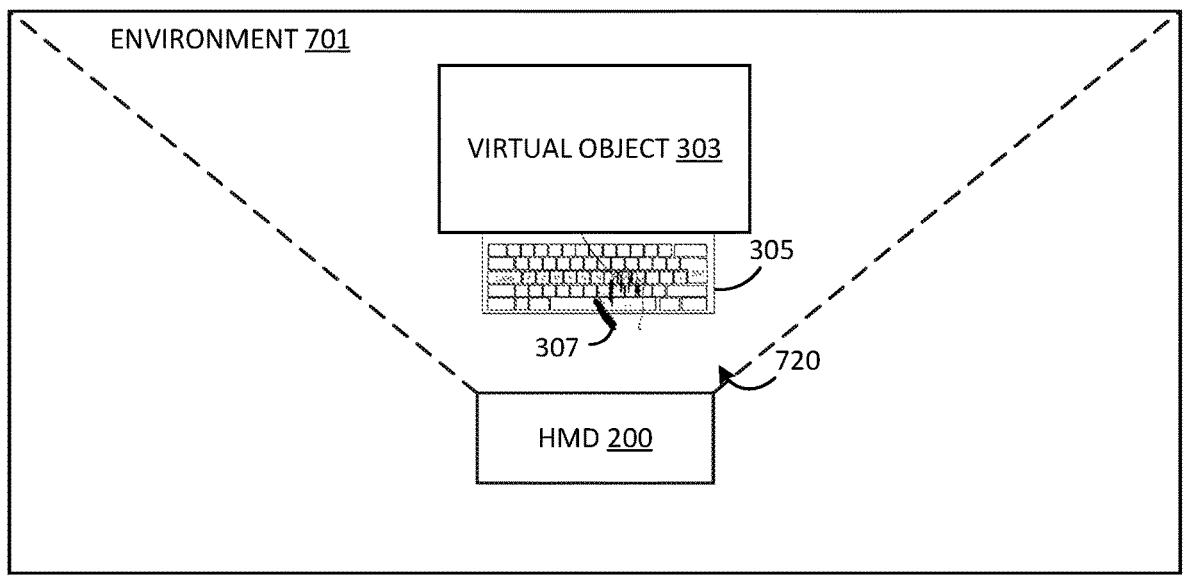

FIGS. 7A-7D illustrate an environment 701. The environment 701 can be any of the environment 301, 401, 501, 601 described herein. The environment 701 includes the virtual object 303 and the virtual input device 305. In some implementations, the environment 701 further includes the hand 307 of the user interacting with the virtual input device 305. FIGS. 7A-7D further illustrate various fields of view of the HMD 200. For example, FIG. 7A illustrates a first field of view 705, FIG. 7B illustrates a second field of view 710, FIG. 7C illustrates a third field of view 715, and FIG. 7D illustrates a fourth field of view 720. Each field of view 705, 710, 715, 720 includes at least a portion of the environment 701.

As shown in FIG. 7A, the virtual object 303 and the virtual input device 305 are fully within the first field of view 705. In other words, each of the virtual object 303 and the virtual input device 305 are in full view of the user of the HMD 200. It should be appreciated that the virtual object 303 and the virtual input device 305 are provided with a specific offset, for example as described in FIG. 6. In FIG. 7B, each of the virtual object 303 and the virtual input device 305 are fully outside of the second field of view 710. In some implementations, the field of view changes from the first field of view 705 to the second field of view 710. For example, the user moving his or her head causes the HMD 200 to move, which changes, or updates, alters, etc., the field of view from the first field of view 705 to the second field of view 710. In other implementations, the field of view itself may not have changed, but the virtual object 303 and the virtual input device 305 can have been moved outside of the field of view, for example by the user unintentionally dragging the virtual object 303 and the virtual input device 305 outside of the first field of view 705.

Therefore, the second field of view 710 presents a challenge in that the user of the HMD 200 is unable to view the virtual object 303 and the virtual input device 305, which makes providing an input to the virtual object 303 via the virtual input device 305 challenging, if not impossible. Therefore, implementations of the present disclosure enable the correction of the removal of the virtual object 303 and the virtual input device 305 from the field of view. FIG. 7C illustrates the third field of view 715, where the virtual object 303 and the virtual input device 305 are gradually reintroduced to the field of view. Rather than virtually instantaneously snapping the virtual object 303 and the virtual input device 305 back to their original position, i.e., location and orientation, within the field of view, the virtual object 303 and the virtual input device 305 are gradually reintroduced to the field of view in order to maintain a more comfortable experience for the user of the HMD 200 that feels more alive and organic. In some implementations, gradual reintroduction is referred to as easing in, i.e., easing the virtual object 303 and the virtual input device 305 back into the field of view.

FIG. 7D illustrates the fourth field of view 720 after the virtual object 303 and the virtual input device 305 have been eased back into the field of view. The fourth field of view 720 is substantially similar to the first field of view 705, in that the virtual object 303 and the virtual input device 305 have been returned to the original position in the first field of view 705.

Figure 8:
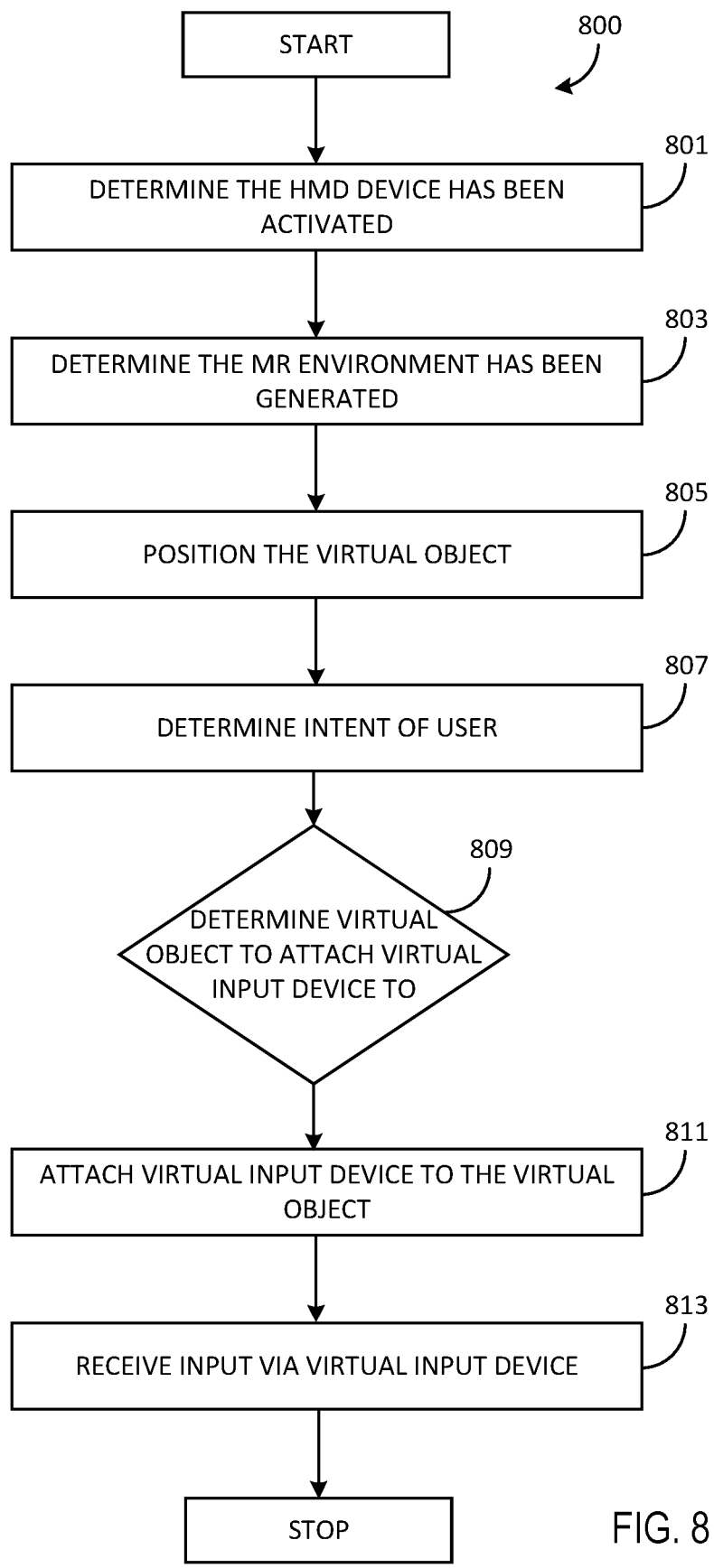
FIG. 8 is a flowchart illustrating a computer-implemented method of receiving an input via a virtual input device according to examples of the present disclosure.

FIG. 8 is a flowchart illustrating a computer-implemented method of attaching a virtual input device to a virtual object according to examples of the present disclosure. The computer-implemented method 800 is for illustration only. Various examples of the computer-implemented method 800 can be performed without departing from the scope of the present disclosure. The computer-implemented method 800 can be executed by one or more electronic devices described herein. For example, the computer-implemented method 800 can be executed by an application in a virtual reality or mixed reality environment as described herein.

The computer-implemented method 800 begins by the application determining an HMD device, such as the HMD 200, has been activated in operation 801. In some implementations, the HMD 200 is activated automatically in response to being placed on the head of a user. In some implementations, the HMD 200 is activated manually by the user. In operation 803, the application determines the virtual reality or mixed reality environment has been generated. In operation 805, the application positions a virtual object, such as the virtual object 303, 403, 503 in the generated virtual reality or mixed reality environment. For example, the virtual object 303 is positioned at particular x, y, and z coordinates within the generated virtual reality or mixed reality environment. Although described herein as occurring in separate steps, it should be understood that operations 801 through 605 can occur simultaneously. For example, the virtual object 303 can be positioned within the virtual reality or mixed reality environment as part of generating the virtual reality or mixed reality environment.

In operation 807, the application determines an intent of a user. In some implementations, the application determines the intent of the user is to provide an input to the application. In operation 809, the application determines the particular virtual object to attach the virtual keyboard 305 to based on the application the user intends to provide an input to.

In operation 811, the application attaches the virtual input device 305 to the determined virtual object 303. In some implementations, the x, y, and z coordinates of the virtual object 303 are used to generate the corresponding x, y, and z coordinates of the virtual input device 305. In some implementations, the virtual input device 305 is provided directly below the virtual object 303 to enable the user to provide the input to the virtual object 303 via the virtual input device 305 without obstructing the view of the virtual object 303. In other implementations, the virtual input device 305 is provided above or to either side of the virtual object 303.

In operation 813, the application receives an input to the virtual object 303 via the virtual input device 305. The application provides a visual representation of the received input on the virtual object 303. For example, where the virtual input device 305 is a keyboard, the virtual object 303 displays the text received as an input via the virtual keyboard.

Although described in connection with an example computing device 100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in anyway, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Additional Examples

An example system includes a memory, a processor communicatively coupled to the memory, and a display device. The display device is configured to display a MR environment provided by at least one application implemented by the processor. The mixed reality environment includes a virtual object corresponding to an application, and a virtual input device. The at least one application docks the virtual input device to the virtual object with an offset relative to the virtual object.

An example computer-implemented method includes displaying, by a display device, a mixed reality environment, positioning a virtual object within the mixed reality environment, the virtual object corresponding to an application; and docking a virtual input device to the virtual object with an offset relative to the virtual object.

An example head-mounted device (HMD) includes one or more lenses configured to display a mixed reality environment including a field of view, the field of vision comprising at least a portion of the mixed reality environment that includes a virtual object and a virtual keyboard, the virtual object corresponding to an application; and at least one processor configured to: determine a docking distance between the virtual object and the virtual keyboard within the mixed reality environment, determine a docking angle between the virtual object and the virtual keyboard within the mixed reality environment, and dock the virtual keyboard to the virtual object using the determined docking distance and the determined docking angle within the field of view.

Alternatively, or in addition to the other examples described herein, examples include any combination of the following:

wherein the offset of the virtual input device to the virtual object includes a predetermined distance between the virtual input device and the virtual object and a predetermined angle between the virtual input device and the virtual object;

wherein the offset of the virtual input device to the virtual object includes a dynamic distance between the virtual input device and the virtual object and a dynamic angle between the virtual input device and the virtual object;

wherein the at least one application docks the virtual input device to the virtual object by creating a hierarchical positioning transformational relationship between the virtual object and the virtual input device;

wherein the display device presents a field of view including at least a portion of the mixed reality environment, the field of view including the virtual object and the virtual input device;

wherein the processor is configured to maintain the virtual object and the virtual input device, including the offset, within the field of view as the field of view changes based at least on a movement of the display device;

wherein the processor is configured to:
detect an update to the field of view based at least on a movement of the display device, the update removing the virtual object and the virtual input device from the field of view, and
return the virtual object and the virtual input device to the updated field of view while maintaining the offset between the virtual object and the virtual input device;

wherein the virtual object is a virtual representation of the at least one application; and wherein the virtual input device is a virtual keyboard.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A system comprising:
a memory storing applications;
a processor communicatively coupled to the memory; and
a display device configured to display a mixed reality environment provided by one or more of the applications implemented by the processor, wherein the mixed reality environment includes:
a first virtual object corresponding to a first application;

a virtual input device, wherein the first application docks the virtual input device to the first virtual object with an offset relative to the first virtual object; and a second virtual object corresponding to a second application, wherein responsive to user input indicating an intent to interact with the second virtual object, the second application docks the virtual input device with an offset relative to the second virtual object.

2. The system of claim 1, wherein the offset of the virtual input device to the first virtual object includes a predetermined distance between the virtual input device and the first virtual object and a predetermined angle between the virtual input device and the first virtual object.

3. The system of claim 1, wherein the offset of the virtual input device to the first virtual object includes a dynamic distance between the virtual input device and the first virtual object and a dynamic angle between the virtual input device and the first virtual object.

4. The system of claim 1, wherein the first application docks the virtual input device to the first virtual object by creating a hierarchical positioning transformational relationship between the first virtual object and the virtual input device.

5. The system of claim 1, wherein the display device presents a field of view including at least a portion of the mixed reality environment, the field of view including the first virtual object and the virtual input device.

6. The system of claim 5, wherein the processor is configured to:
detect an update to the field of view based at least on a movement of the display device, the update removing the virtual object and the virtual input device from the field of view, and
return the virtual object and the virtual input device to the updated field of view while maintaining the offset between the virtual object and the virtual input device.

7. The system of claim 1, wherein the first virtual object and the virtual input device, including the offset, are maintained in an original position proximate to an original position of a user based at least on a movement of the display device indicating movement of the user to another position.

8. The system of claim 1, wherein responsive to user input indicating an intent to transition back to interact with the first virtual object, re-positioning the virtual input device with the offset relative to the first virtual object.

9. The system of claim 1, wherein the user input indicating the intent is one of: an input received via the virtual input device, a gaze pattern determined by the display device, or a selection of a command on the first virtual object.

10. A computer-implemented method comprising:
displaying, by a display device, a mixed reality environment,
positioning a first virtual object within the mixed reality environment, the first virtual object corresponding to a first application;
docking a virtual input device to the first virtual object with an offset relative to the first virtual object;
receiving a user input indicating an intent to interact with a second virtual object corresponding to a second application; and
responsive to the user input, docking the virtual input device to the second virtual object with an offset relative to the second virtual object.

11. The computer-implemented method of claim 10, wherein the offset of the virtual input device to the first virtual object includes a predetermined distance between the virtual input device and the first virtual object and a predetermined angle between the virtual input device and the first virtual object.

12. The computer-implemented method of claim 10, wherein docking the virtual input device to the first virtual object further comprises creating a hierarchical positioning transformational relationship between the first virtual object and the virtual keyboard.

13. The computer-implemented method of claim 10, wherein displaying the mixed reality environment further comprises:
displaying, by the display device, a field of view including at least a portion of the mixed reality environment, the field of view including the first virtual object and the virtual input device;
detecting an update to the field of view; and
maintaining the first virtual object and the virtual input device in the updated field of view.

14. The computer-implemented method of claim 10, wherein positioning the first virtual object within the mixed reality environment further comprises:
positioning the first virtual object relative to an original position of a user associated with the display device;
detecting movement of the display device indicating movement of the user to another position; and
maintaining the positioning of the first virtual object relative to the original position of the user.

15. The computer-implemented method of claim 10, further comprising:
receiving a user input indicating an intent to transition back to interact with the first virtual object; and
responsive to the user input, re-positioning the virtual input device to the first virtual object with the offset relative to the first virtual object.

16. A head mounted device (HMD) comprising:
one or more lenses configured to display a mixed reality environment including a field of view, the field of view comprising at least a portion of the mixed reality environment that includes a first virtual object and a virtual input device, the virtual object representing a first application; and
at least one processor configured to:
determine a docking distance between the first virtual object and the virtual input device within the mixed reality environment,
determine a docking angle between the first virtual object and the virtual input device within the mixed reality environment,
dock the virtual input device to the first virtual object using the determined docking distance and the determined docking angle within the field of view;
receive a user input indicating an intent to interact with a second virtual object corresponding to a second application;
responsive to the user input, determine a second docking distance and a second docking angle between the second virtual object and the virtual input device; and
dock the virtual input device to the second virtual object with the determined second docking distance and the determined second docking angle within the field of view.

17. The HMD of claim 16, wherein the at least one processor is further configured to:
detect a movement of the second virtual object within the field of view, and control the virtual input device to move with the second virtual object and maintain the determined second docking distance and the determined second docking angle.

18. The HMD of claim 16, wherein determining the docking distance and the docking angle further comprises the at least one processor further configured to:
position the first virtual object relative to an original position of a user associated with the HMD;
detect movement of the HMD indicating movement of the user to another position; and
maintain the position of the first virtual object relative to the original position of the user.

19. The HMD of claim 16, wherein the at least one processor is further configured to:
detect a change in the field of view that causes the virtual input device and the second virtual object to be outside of the changed field of view, and
gradually reintroduce the second virtual object and the virtual input device into the changed field of view while maintaining the determined second docking distance and the determined second docking angle between the second virtual object and the virtual input device.

20. The HMD of claim 16, wherein, to dock the virtual input device to the first virtual object, the at least one processor is further configured to:
create a hierarchical positioning transformational relationship between the first virtual object and the virtual input device.

* * * * *